United States Patent
Natanzon et al.

(10) Patent No.: US 9,639,592 B1
(45) Date of Patent: May 2, 2017

(54) DYNAMICALLY SWITCHING BETWEEN SYNCHRONOUS AND ASYNCHRONOUS REPLICATION

(71) Applicant: EMC Corporation, Hopkinton, MA (US)

(72) Inventors: Assaf Natanzon, Tel Aviv (IL); Lev Ayzenbergv, Petach Tikva (IL); Yossi Mossel, Tel Aviv (IL); Ido Singer, Nes-Ziona (IL); Oded Kedem, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/680,338

(22) Filed: Nov. 19, 2012

Related U.S. Application Data

(63) Continuation of application No. 12/647,451, filed on Dec. 26, 2009, now Pat. No. 8,341,115.

(51) Int. Cl.
  *G06F 7/00* (2006.01)
  *G06F 17/00* (2006.01)
  *G06F 17/30* (2006.01)

(52) U.S. Cl.
  CPC .............................. *G06F 17/30578* (2013.01)

(58) Field of Classification Search
  CPC ......... G06F 17/30578; G06F 17/30575; G06F 17/30174; G06F 11/2097; G06F 2201/84
  USPC ............................ 707/613, 999.202, 999.204
  See application file for complete search history.

(56) References Cited

U.S. PATENT DOCUMENTS

| | | | |
|---|---|---|---|
| 7,257,689 B1 * | 8/2007 | Baird | 711/162 |
| 7,415,589 B2 * | 8/2008 | Hirakawa et al. | 711/162 |
| 7,509,468 B1 * | 3/2009 | Dalal et al. | 711/163 |
| 7,941,576 B2 * | 5/2011 | Adams | 710/29 |
| 7,962,458 B2 * | 6/2011 | Holenstein et al. | 707/704 |
| 8,055,943 B2 * | 11/2011 | Edel et al. | 714/20 |
| 8,099,539 B2 * | 1/2012 | Marulkar et al. | 710/309 |
| 8,195,844 B2 * | 6/2012 | Fulton et al. | 710/20 |
| 8,301,593 B2 * | 10/2012 | Hoffmann et al. | 707/615 |
| 8,364,636 B2 * | 1/2013 | Newport et al. | 707/612 |
| 2005/0203908 A1 * | 9/2005 | Lam et al. | 707/10 |
| 2007/0088763 A1 * | 4/2007 | Yahalom et al. | 707/201 |
| 2007/0106712 A1 * | 5/2007 | Yamato et al. | 707/204 |
| 2007/0106824 A1 * | 5/2007 | Hikita | 710/29 |
| 2008/0082592 A1 * | 4/2008 | Ahal et al. | 707/204 |
| 2008/0140436 A1 * | 6/2008 | Burkhardt et al. | 705/1 |
| 2009/0112789 A1 * | 4/2009 | Oliveira et al. | 707/1 |
| 2009/0313311 A1 * | 12/2009 | Hoffmann | G06F 11/2097 |
| 2012/0124251 A1 * | 5/2012 | Hnatko et al. | 710/29 |

* cited by examiner

*Primary Examiner* — Hosain Alam
*Assistant Examiner* — Nicholas Allen
(74) *Attorney, Agent, or Firm* — Krishnendu Gupta; Joseph D'Angelo

(57) ABSTRACT

In a system comprising a production environment and a replication environment, a method and program product for dynamically switching from an asynchronous replication policy to a synchronous replication policy. In a system comprising a production environment and a replication environment, a method for dynamically switching from a synchronous replication policy to an asynchronous replication policy.

18 Claims, 10 Drawing Sheets

0
DYNAMICALLY SWITCHING BETWEEN SYNCHRONOUS AND ASYNCHRONOUS REPLICATION

RELATED APPLICATIONS AND PRIORITY CLAIM

This Application is a Continuation of U.S. patent application Ser. No. 12/647,451 entitled "DYNAMICALLY SWITCHING BETWEEN SYNCHRONOUS AND ASYNCHRONOUS REPLICATION" filed on Dec. 26, 2009, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In a system comprising a production environment and a replication environment, a method and program product for dynamically switching from an asynchronous replication policy to a synchronous replication policy. In a system comprising a production environment and a replication environment, a method for dynamically switching from a synchronous replication policy to an asynchronous replication policy.

DESCRIPTION OF DRAWINGS

The above and further advantages of the present invention may be better under stood by referring to the following description taken into conjunction with the accompanying drawings in which:

BRIEF DESCRIPTION OF THE DRAWINGS

Figure 1:
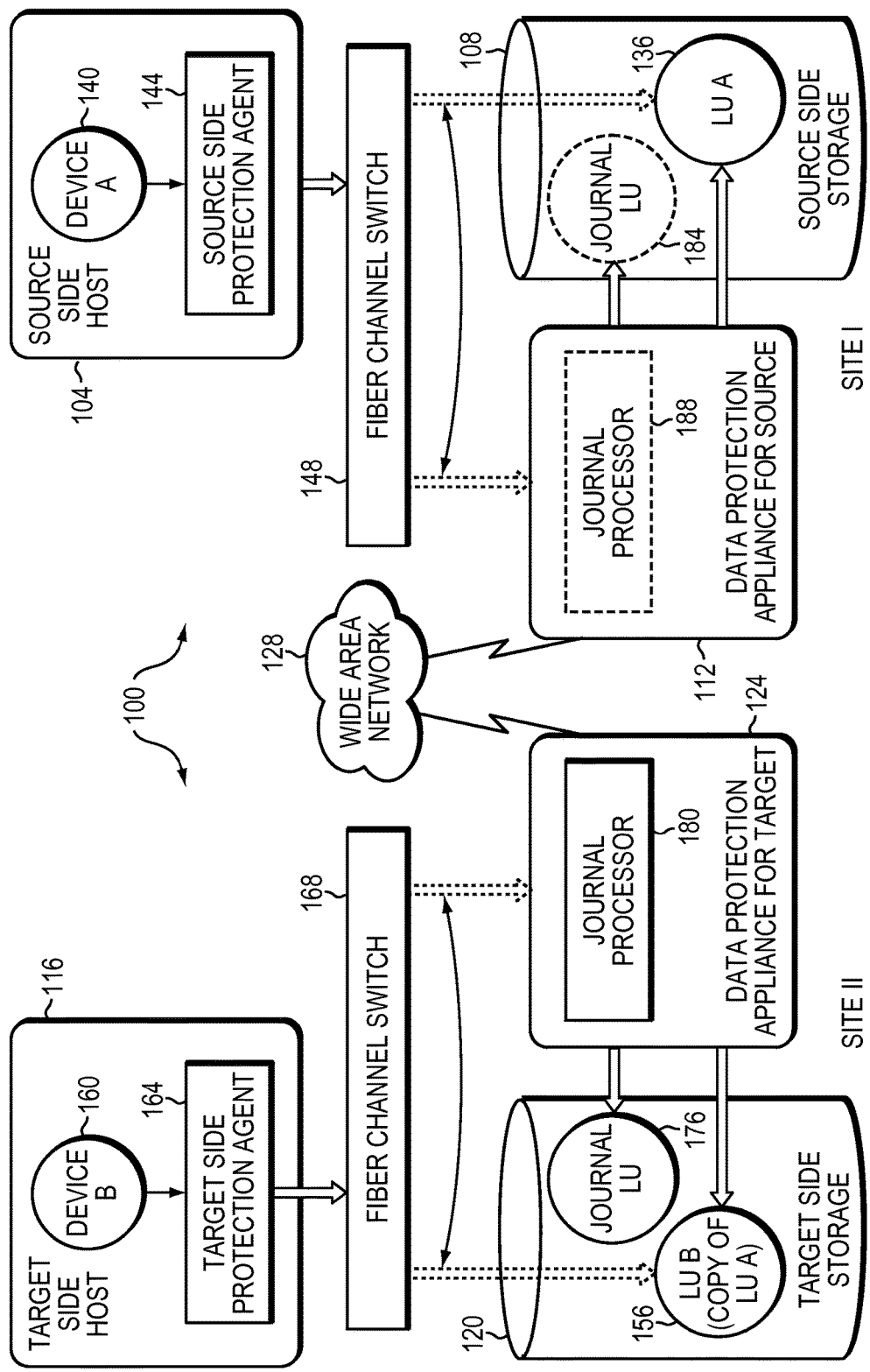
Figure 2:
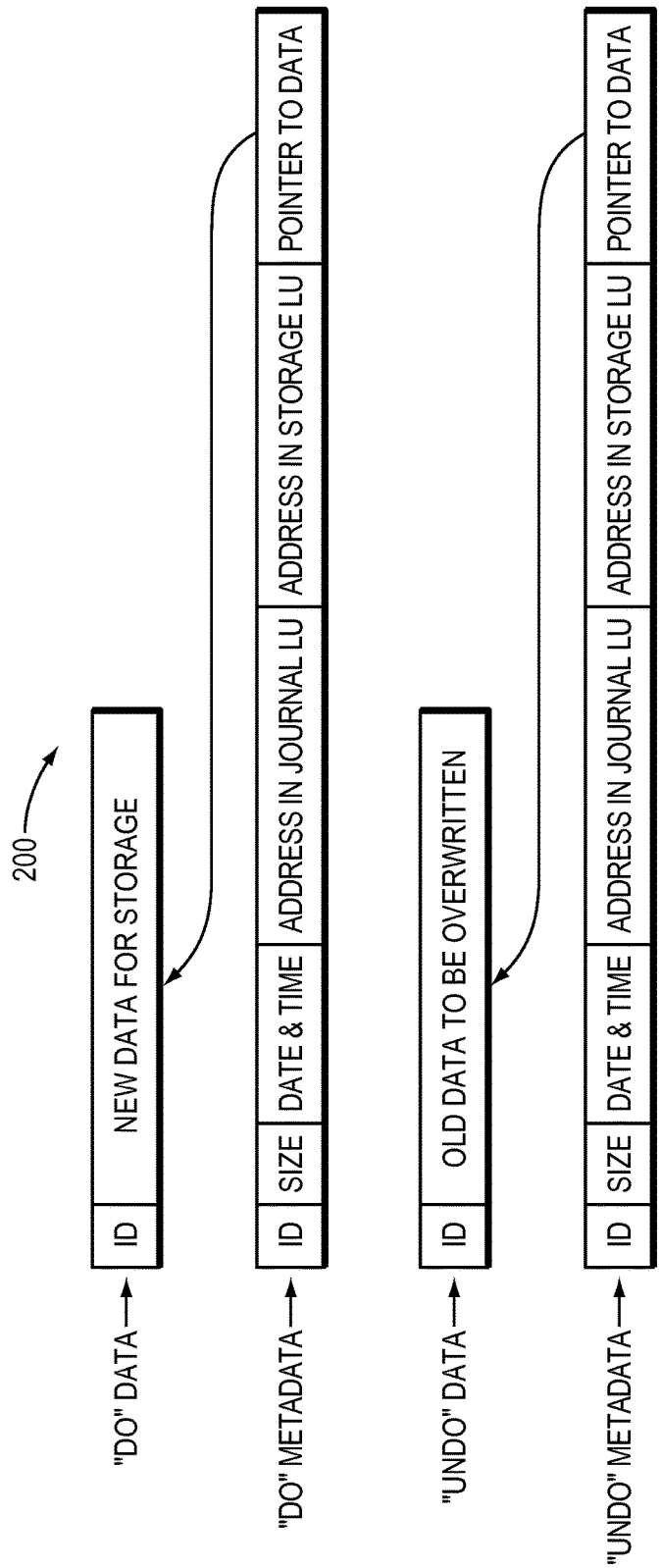
Figure 3:
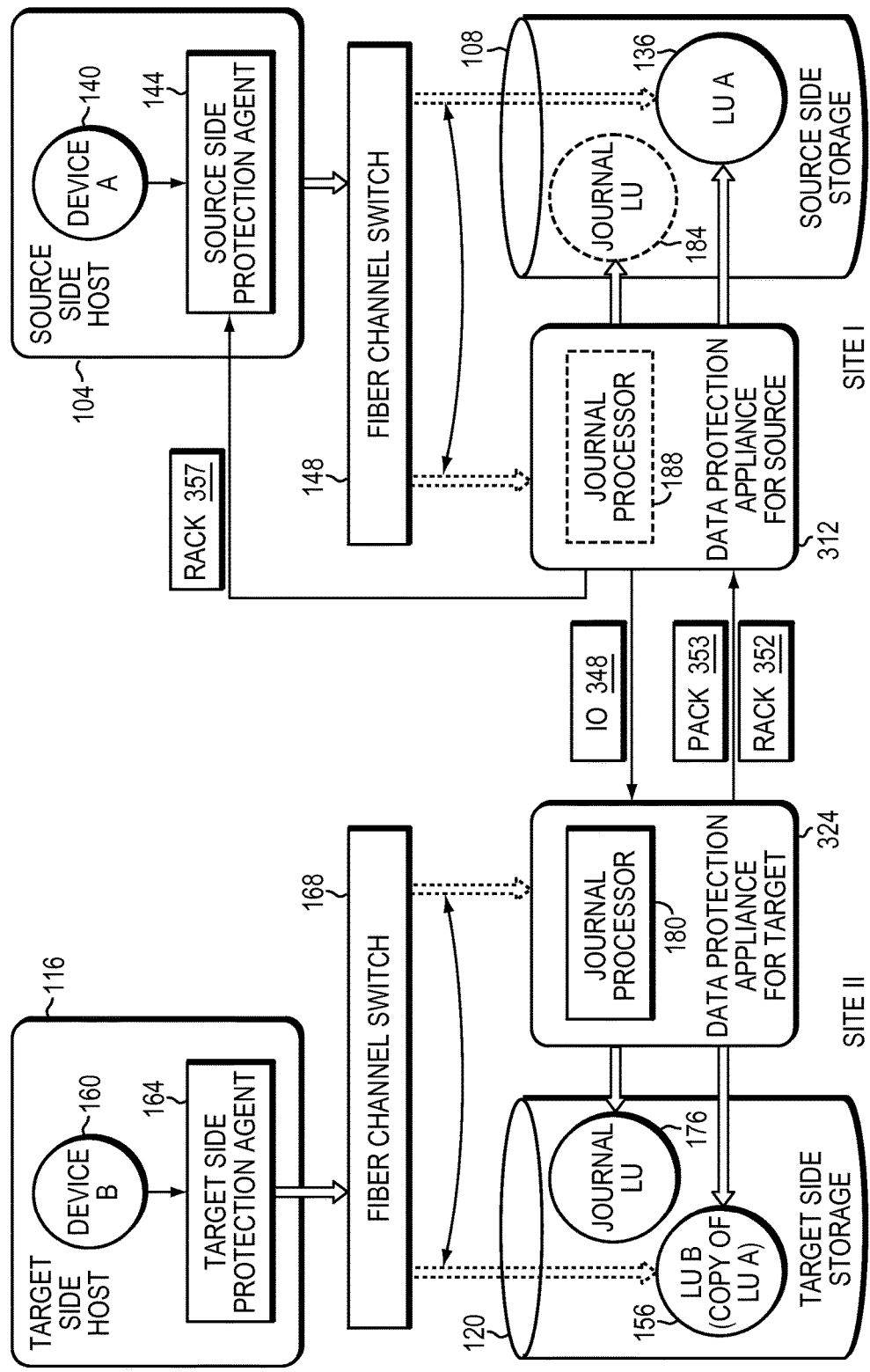
Figure 4:
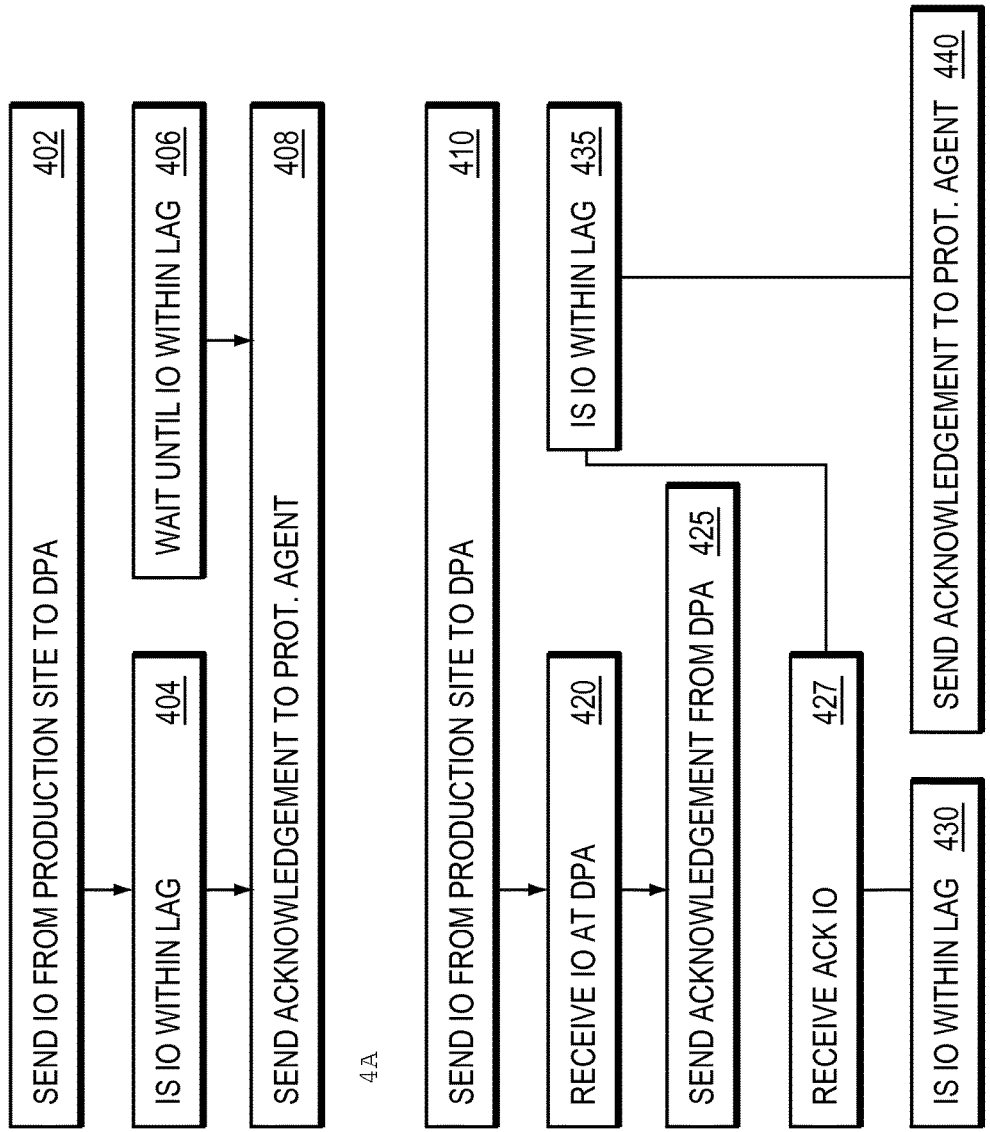
Figure 5:
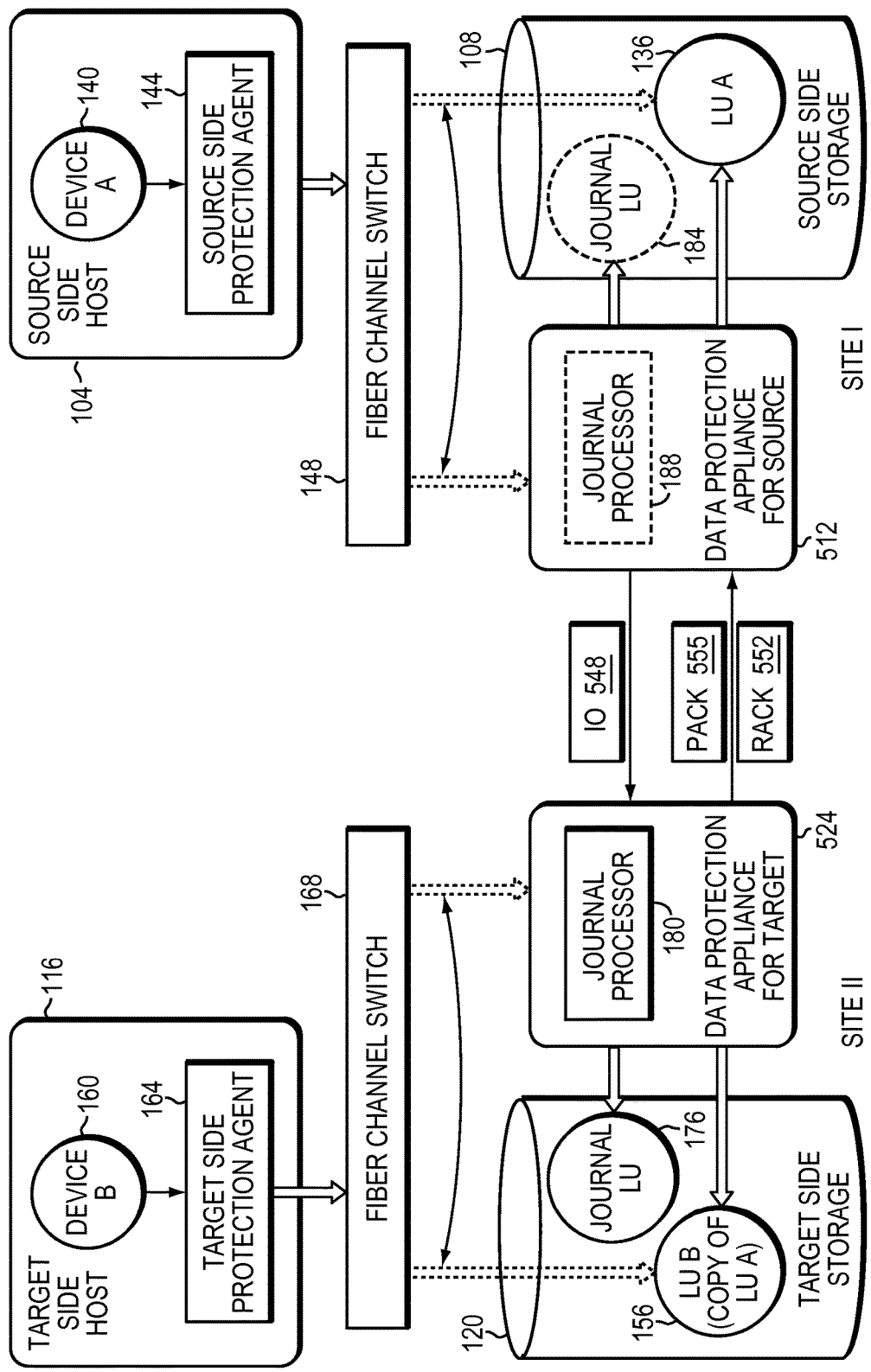
Figure 6:
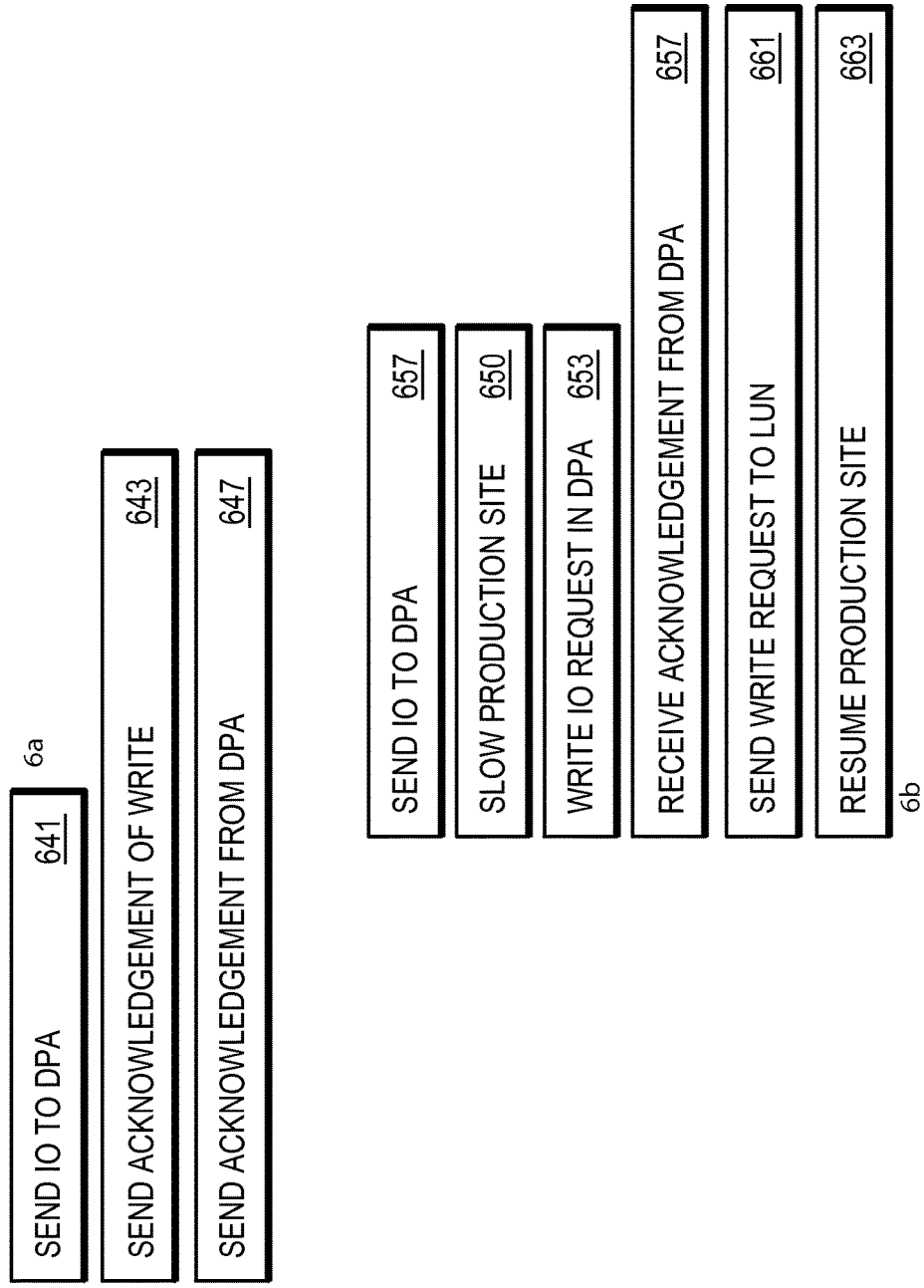
Figure 7:
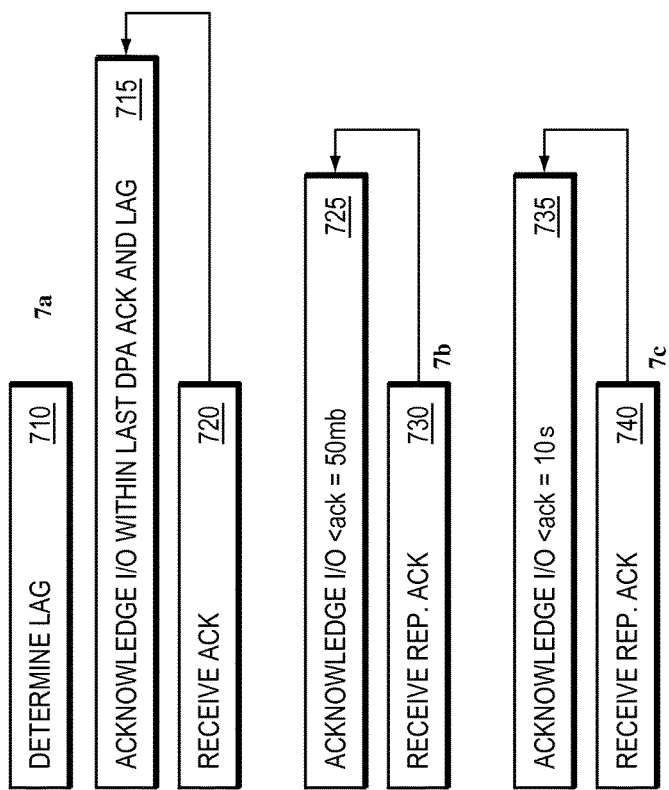
Figure 8:
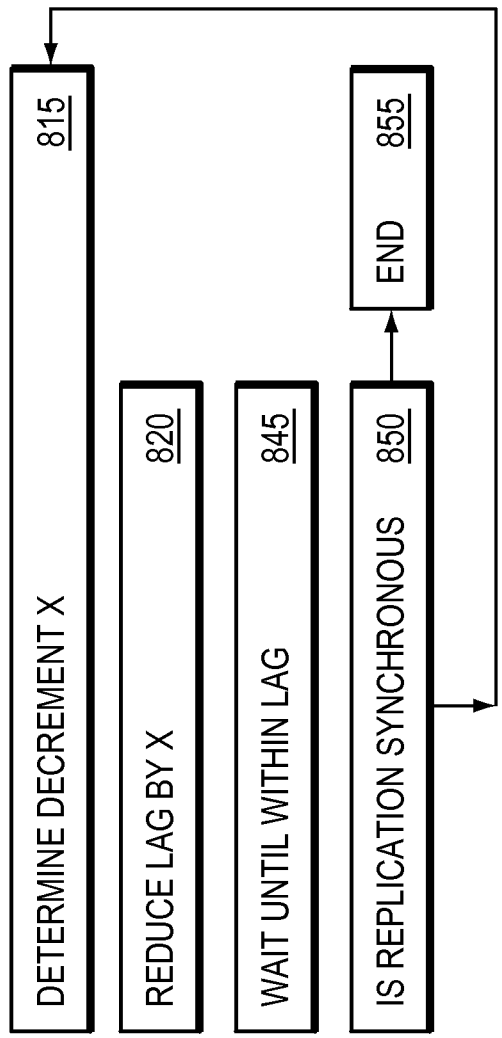
Figure 9:
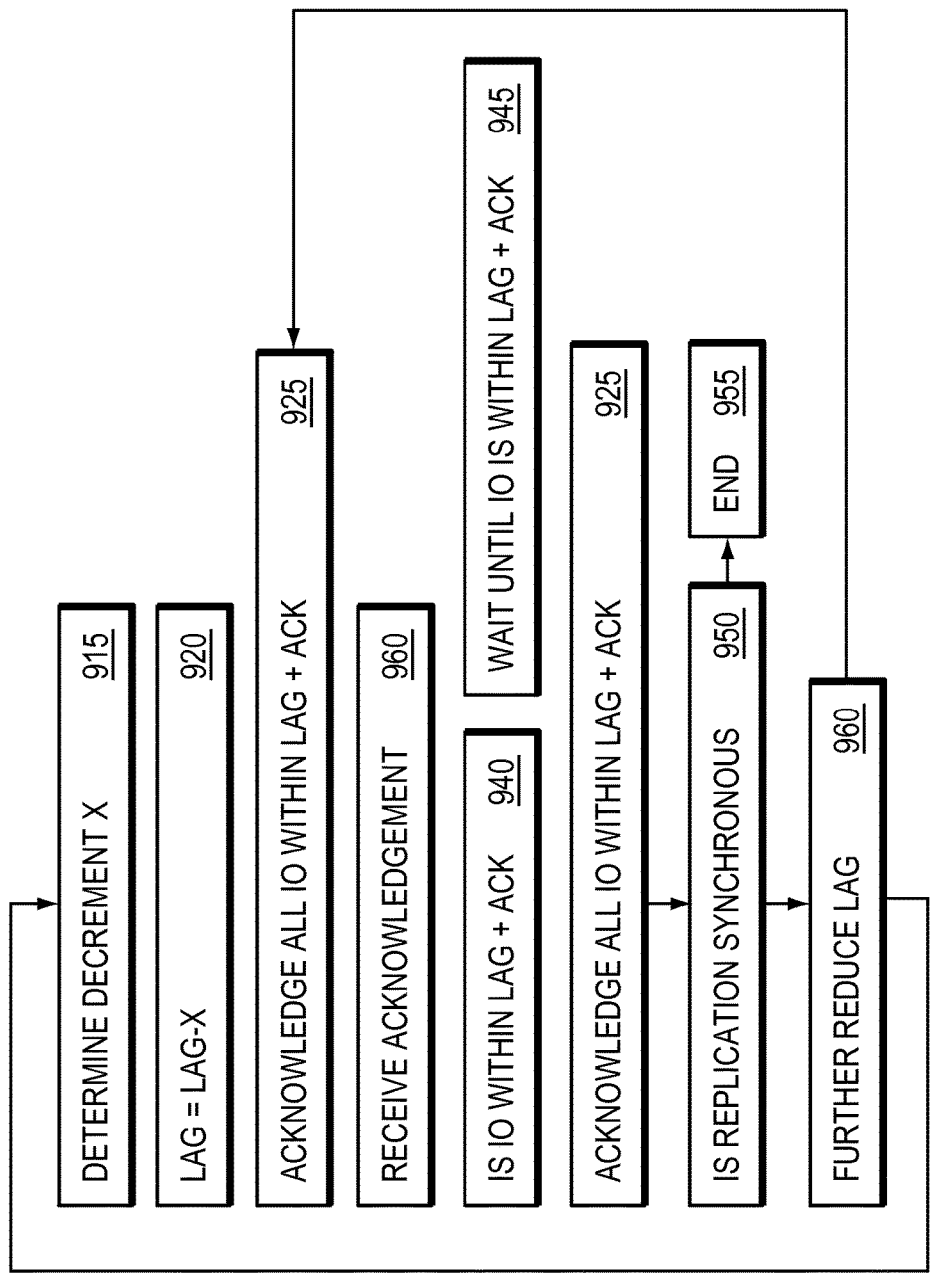
Figure 10:
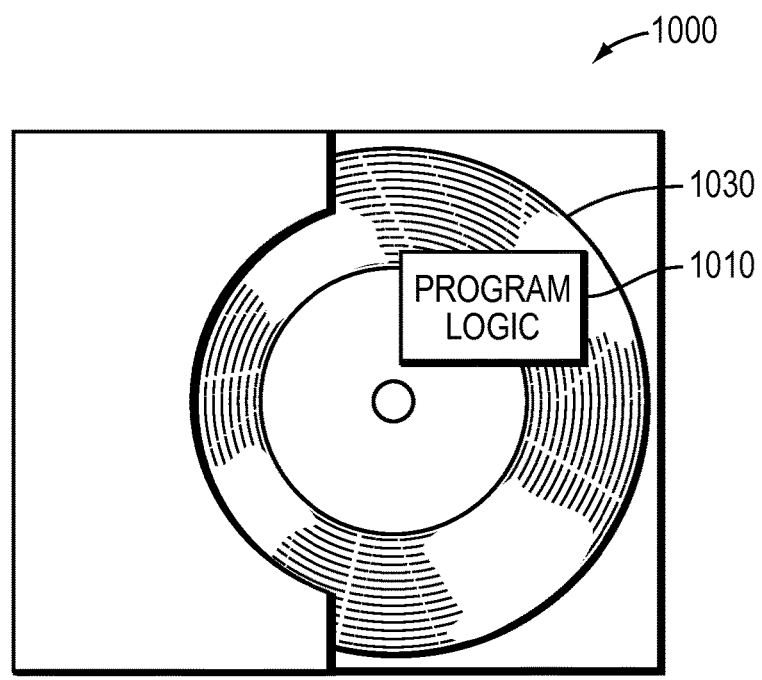

The present invention will be more fully understood and appreciated from the following detailed description, taken in conjunction with the drawings in which:

FIG. 1 is a simplified block diagram of a data protection system, in accordance with an embodiment of the present invention;

FIG. 2 is a simplified illustration of a journal history of write transactions for a storage system, in accordance with an embodiment of the present invention;

FIG. 3 is a simplified block diagram of a data protection system illustrating transfer of IO and acknowledgements, in accordance with an embodiment of the present invention;

FIG. 4a is a simplified flowchart of a data protection method during a asynchronous data replication, in accordance with an embodiment of the present invention;

FIG. 4b is a simplified flowchart of a data protection method during a asynchronous data replication, in accordance with an embodiment of the present invention;

FIG. 5 is a simplified block diagram of a data protection during synchronous replication, in accordance with an embodiment of the present invention;

FIG. 6 is a simplified flowchart of a data protection method during a synchronous data replication, in accordance with an embodiment of the present invention;

FIG. 7a is a simplified flowchart of a data protection method during asynchronous data protection, in accordance with an embodiment of the present invention;

FIG. 7b is a simplified flowchart of a data protection method during asynchronous data protection, in accordance with an alternative embodiment of the present invention;

FIG. 7c is a simplified flowchart of a data protection method during asynchronous data protection, in accordance with a further embodiment of the present invention;

FIG. 8 is a simplified flowchart of a data protection method during a switch from asynchronous to synchronous data protection, in accordance with an embodiment of the present invention;

FIG. 9 is a simplified flowchart of a data protection method during a switch from asynchronous to synchronous data protection, in accordance with an embodiment of the present invention; and FIG. 10 is an embodiment of the current invention stored on a computer readable medium.

DETAILED DESCRIPTION

Techniques of the current invention may allow the user to configure a system to move transparently and dynamically between synchronous and asynchronous replication. Moving to and out of sync replication may happen for any number of reasons. For example, the user may want to balance bandwidth, preferring to use asynchronous replication during periods of high network activity. Alternatively, a switch may be dictated by some I/O rate bound. As well, the decision to switch between synchronous and asynchronous replication could depend on latency as well as any other number of reasons. For example, such as when system load is high or network latency goes over a threshold. The system may automatically move back to synchronous replication when the state allows, this all may happen transparently to the user, and the user can configure the system so that only in extreme cases will the system move out of sync in order to reduce application latency. When in sync replication application, latency may be limited by the network latency, in async replication the network latency may not affect the application latency.

An embodiment of the present invention concerns methods and systems for providing continuous data replication under by switching from a synchronous to asynchronous replication policy and switching from an asynchronous to synchronous replication policy. Depending on a set of conditions, a replication policy may either record a journal synchronously or asynchronously. For example, a nominal journaling policy operates asynchronously, allowing production site data transactions to proceed prior to completion of logging of previous data transactions.

In synchronous replication the application may receive acknowledgments after the data is secured at the replica site. There may be two separate modes: remote journal secured where the application get acknowledged when data is safely written at the remote journal, or remote appliance secured where the application may get acknowledgment after the data arrives to the RPA at the replica site The nominal journaling policy may change due to an accelerated policy when a backlog of data transactions exceeds a predetermined size, and may change back to the nominal policy when the backlog is suitably relieved. In addition, the present invention may use a near real-time replication policy when the latency between the production site and the replica site is low enough, when the IO rate is low enough to support synchronous replication.

In another embodiment of the present invention, a system is presented for continuous data replication, including a receiver for receiving a plurality of write transactions from a data production site, for application at a data backup site, a state machine for dynamically selecting one of a plurality of journaling processes based on at least one processing state transition rule, wherein each of the plurality of journaling processes controls the queuing, recording and application of write transactions received at the backup site, and wherein each of the at least one processing state transition rule relates directly or indirectly to rates of incoming write transactions at the data backup site, a queue manager coupled with the receiver and the state machine for temporarily queuing write transactions at the backup site within a queue until they can be applied, in accordance with the selected journaling process, and a memory manager coupled with the receiver and the state machine for recording write transactions at the backup site, for data recovery purposes, in accordance with the selected journaling process, and a storage manager coupled with the receiver and the state machine for applying the write transactions at the backup site, in accordance with the selected journaling process.

There is additionally provided in accordance with an embodiment of the present invention a computer-readable storage medium storing program code for causing a computing device to receive a plurality of write transactions from a data production site or a production environment, for application at a data backup site, select one of a plurality of journaling processes based on at least one processing state transition rule, wherein each of the plurality of journaling processes controls the queuing, recording and application of write transactions received at the backup site, and wherein each of the at least one processing state transition rule relates directly or indirectly to rates of incoming write transactions at the data backup site, temporarily queue write transactions at the backup site within a queue, in accordance with the selected journaling process, record write transactions at the backup site, for data recovery purposes, in accordance with the selected journaling process, and apply the write transactions at the backup site, in accordance with the selected journaling process.

The following definitions may be useful in understanding the specification and claims.

BACKUP SITE—a facility where replicated production site data is stored; the backup site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

IOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

Splitter acknowledgements—an acknowledgement from an DPA to the protection agent that data has been received at DPA, this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

Remote acknowledgements—an acknowledgement from remote DPA to the local DPA that data arrived at the remote DPA (either to the appliance or the journal)

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Embodiment of a Replication System

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to hack up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Asynchronous Data Replication

Referring to the embodiment of FIG. 3, when in asynchronous data replication mode, a, DPA 312 may send an acknowledgement 357 to protection agent 344 before sending I/O request 348 to DPA 324, before receiving an acknowledgement back 427 from DPA 324 that the I/O request 348 has been written or received 420 at DPA 324. This may create a lag between when the DPA 324 processes this request and when the protection agent 344 receives an acknowledgement of the processing.

In some embodiments, the lag time or latency may be expressed any number of ways such as no more than a given period of time, a set amount of data (i.e. number of blocks), or a number of data transactions. A period of time may vary or may be a predetermined period of time selected though user configuration. The amount of pending IO allowed may be variable, set to a predetermined amount, or set by the user. The amount of lag may correspond to the IO that may be sent to the replication site, also referred to herein as a replication environment, before it is acknowledged may be referred to as a protection bound. As well, the amount of lag may change each time an acknowledgement is received from the RPA, as acknowledgement may update the time, data count, or amount of IO transferred.

In further embodiments, when in asynchronous data replication mode, there may be an increased chance of data loss. The data loss may occur as the acknowledgement of receipt of an I/O 348 has been logged, before the I/O may be written to the DPA 324. If there is a crash between the acknowledgement and when the I/O is written, this data may be lost. However, asynchronous data replication may be useful when latency does not allow synchronous replication or when some small amount of data loss is allowed.

In alternative embodiments, asynchronous data replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

For example refer embodiments of asynchronous replication refer to FIGS. 3 and 4a and 4b. The source protection agent 344 sends 402 an IO 348 to the production DPA 312, if the IO 348 is within 404 the protection bound or lag the DPA 312 will send an acknowledgement 357 to the protection agent 344, otherwise it will wait 406 until the IO is within the protection bound and then acknowledge 408 it. Each IO may have a time stamp, a data counter, which may count the amount of data sent in the consistency group, a transaction counter, which may increase by one when a transaction arrives at the DPA (counted per consistency group), and a time counter, which may be the exact time the IO arrived at the DPA.

In some embodiments, the protection bound may be controlled by a data counter, transaction counter and time counter. If the allowed lag is, for instance, 10 seconds and the latest IO arrived at the replica site has time counter of 5 seconds ago, the system will acknowledge all IOs immediately for the next 5 seconds. If the allowed lag is 1000 transactions, and the latest transaction counter arrived at the replica site is n, all IOs with transaction counters <n+1000 will be acknowledged to the protection agent immediately when they arrive to the DPA, IOs with higher transaction counter will be delay, until an acknowledgment is received 420 from the replica DPA 324.

In the embodiments of FIGS. 3 and 4b, the IO 348 is sent 410 to the remote DPA 324, when the IO is received 420 at the DPA the DPA will acknowledge 425 to the source DPA 312 that the IO 348 arrived, the acknowledge will include the IO information (transaction, data and time counters), when acknowledge 353 or acknowledgement 352, depending on user configuration, arrives at DPA 312, the bounds are fixed and now all delayed IOs which admit the relevant bound can be acknowledged to the protection agent. Acknowledgement 353 may denote that the IO was processed at DPA 324 where Acknowledgement 352 may denote that the IO was received at DPA 324. Either acknowledgement, deepening on user configuration, may be used to update the pending IO.

The DPA 312 will receive 427 the Ack 353 or Ack 352. If, based on the Ack, more IO is within the lag 430, an acknowledgement 357 will be sent to the protection agent 344. The user may be able to configure the replication to not delay the application if the protection bound is set to infinite. The user may choose if acknowledgment 353 is sent when the IO arrives at the remote DPA or when IO is flushed to the remote journal.

Synchronous Data Replication

Referring to the embodiments of FIGS. 5 and 6a and 6b, synchronous data replication may require that a DPA 512 receives 647 a remote acknowledgement 555 or acknowledgement 552 from DPA 524. Depending on user configuration either acknowledgement may be used to update the pending IO. Acknowledgement 552 may acknowledge when the IO is received at DPA 524 and acknowledgement 555 may acknowledge when the IO is processed at DPA 524. IO may be sent 641 to DPA 524 and after processing each IO transaction, such as IO 548, at DPA 524, DPA 524 may send 643 a remote acknowledgement 555 (either when data receiver or when data arrived to journal based on user configuration). When DPA 512 receives back an acknowledgement 555 or acknowledgement 552 from DPA 524 that the IO has been processed, DPA 512 in turn may send an acknowledgement back to protection agent 544 (using scsi status). Protection agent 544 may wait if not within the protection hound until receipt of such acknowledgement before sending the SCSI write request to LU A 536. Based on the acknowledgements, the production site may be slowed 550. The production site may be slowed as an effect of IOs not being completed as SCSI status is being delayed, when DPA 512 return the status IOs completes.

During synchronous data replication mode, the production site may to be slowed 550 to wait until the I/O has been processed on the replication site before processing can continue. This may ensure that no data is lost as an acknowledgement of data replication only occurs after the data is replicated. However, synchronous data replication may not be as quick as asynchronous data replication and may result in slower replication, which in turn may slow down the production site.

Switching Between Asynchronous Data Replication and Synchronous Data Replication It may be advantageous to switch between synchronous and asynchronous data replication for a number of reasons.

As well it may be advantageous to make such a switch transparent to the user. However, typical solutions have not been able to switch from one type of replication to the other, transparent to the user, and conventionally have not been able to do so without stopping the replication, performing the switch, then restarting the replication. In an embodiment, the current techniques allow the replication to shift between synchronous to asynchronous replication in a manner that is transparent to the user without stopping the replication. The current techniques further offer the benefit that sync and async replication may be combined into a single technology, completely different products.

For example, it may be beneficial to switch between synchronous to asynchronous replication based on the time of day or week the replication is occurring. A user may decide that replication during weekday mornings is extremely busy and asynchronous journaling may allow the processing to occur without users experiencing a lag in the system. Conversely, a user may decide that on the weekends, when there is batch operations occur, which require significant bandwidth, but generate less important data in case of a loss, and thus use sync replication during weekdays and async during weekend.

The switch may be made based on bandwidth, time, latency, or data to be transferred. Often, users would like to have sync replication but would not want to slow down production to achieve this; thus the user may want to move temporarily to async mode when latency is higher than a threshold.

The current techniques may leverage a journal type replication to enable a switch between synchronous and asynchronous replication. For example, a switch between synchronous to asynchronous replication may require only that the replication system begin to acknowledge receipt of an I/O when it is received at a replication device, not when the I/O has been written. However, a switch from asynchronous to synchronous replication may a more complex procedure.

Switch from Synchronous to Asynchronous Data Replication

The switch from synchronous to asynchronous data replication may be made for any number of reasons. However, in an embodiment using journaling, the switch may be made transparently to the user. In general, the system may begin to acknowledge that the I/O has been received before it is written or processed on the replication device. In some embodiments, certain latency requirements may still be enforced. For example, it may be preferable there be no more than a lag of X megabytes of data to be written (i.e. in case of a disaster no more then X MB will be lost), that there be no more than Y seconds between when an I/O is acknowledged and written to the replication device, or that there be no more than Z number of outstanding transactions which have not been acknowledged. Yet, in general, the switch from synchronous to asynchronous data replication may require that acknowledgements that the data has been written on the replication site prior to writes on the production site not be enforced, while the system may still send acknowledgements that the data was received at the replication site. This change may occur without stopping the replication and this change may be transparent to the user or production site. In fact, the user may have no knowledge of the change, in terms of operation, however may be able to view the change in the user interface.

In an embodiment a switch from synchronous to asynchronous replication may be performed by enforcing a write lag of 50 megabytes. For example take a system which is replicating synchronously and acknowledging I/O as it is written. In an embodiment, the production system may write up to an amount, say 50 megabytes of data, without receiving a remote acknowledgement that the data has reached the replication site.

This may enable the production system to have 50 megabytes of data pending at the replication site that may not have been written or acknowledged as having been written on the replication site. This may enable the production site to not enforce acknowledgements before writes, allowing a set amount of data to be written on the production site without receiving an acknowledgement that the data has been written on the replication site. During times of sporadic activity at the production site, this may provide a buffer to allow the production site to continue to function normally, where if the system where replicating synchronously, the production site might have to be slowed.

Referring to the embodiments of FIGS. 5, 7a, 7b, and 7c, a switch from synchronous to asynchronous replication may determine 710 a lag. The DPA 512 may acknowledge all IO based on the lag and the last received acknowledgment. The DPA 512, may receive another acknowledgement 552 from RPA 524 and acknowledge 715 any more IO now within the lag. This lag may be an amount, such as 50 megabytes 725 that have not been written by the Replication Data site 524, or it could be measured in time, such as a lag of 10 sec 735 before the data is written to the remote site 524.

In an embodiment, when the allowed lag is 50 MB, the production DPA 512 holds the latest acknowledge 552 from the remote site, and will acknowledge, all IO that have transaction counter <ack+50 MB to the protection agent 725. The source DPA 512 gets IO and holds a remote ack with transaction counter, data counter and time counter, if the current IO is less then 50 MB more the ack data counter, it will be acknowledged to the protection agent. The remote DPA 524 will send DPA 512 a remote ack when either data arrives at DPA 524 or when IO is written to the journal.

Switch from Asynchronous Data Replication to Synchronous Data Replication

Switching from asynchronous data replication to synchronous data replication may require more steps. In general, an asynchronous data replication may allow a lag time. A lag may the amount of data loss allowed in case of a disaster, it may be 0 for sync replication. Latency is the time is takes for an IO to arrive from local to remote site during sending of the IO) between when a data is acknowledged as received and acknowledged as written. This lag results in the possibility that data may be lost before it is written if the device crashes or the data is corrupted after the data is received but before it is written. The accepted lag may be user configured or may be configured by the system. Switching from asynchronous to synchronous replication may require the system to eliminate all of the lag, acknowledging each write at the replication site to the production site as it occurs. This may, in turn, may require that the production site be slowed in order to receive the write acknowledgement before writing the acknowledgement on the production site.

The current techniques, in an embodiment, leverage the journal to switch between asynchronous data replication to synchronous data replication. In an embodiment, the system may decide to switch between asynchronous data replication to synchronous data replication in a series of steps to make the switch transpiration to the user. For example, in an embodiment, the system may reduce the lag between the acknowledgements and the writes by a factor, for example, 1 second. In this embodiment, the lag could be shifted from an eight second lag to a seven second lag. The system may wait until the seven second lag was achieved, it may then lower the latency again to a six second lag.

As the lag is being lowered, the production site may be slightly slowed to delay the I/Os being sent to the replication device. That is, the processing on the source device may be slightly limited to allow the new latency requirement to be reached. However, this slowing of the production site may be small enough that it is not recognized by the user on the production or source site. As well, this slowing of the production site may be less than if the system were to lower the lag by a larger factor. In some embodiments, the amount to lower the latency may be chosen to be an amount that will slow the production site by an amount that would be transparent to the user. In other embodiments, the lag reduction may be such that the production site may not be slowed at all. In further embodiments, lowering of the lag may be timed to further enable the production system to deal with the reduction without slowing the production system or with a minimal reduction.

Take an alternative embodiment where the switch from asynchronous to synchronous replication may be performed in terms of the amount of I/O yet to be written. For example refer to the embodiments of FIG. 8. The current lag may be 500 mb denoting I/O that has been sent to the DPA but not written acknowledged as written. An embodiment of the current techniques could reduce 820 the lag from 500 mb to 450 mb by determining 815 a decrement X of 50 mb. As the lag in the Journal reduced to 450 mb, in the embodiment of 845 by waiting 845 for the replication site to process the 10, the lag could again be reduced 815 by another 50 mb from 450 to 400. The system may wait 845 for the new lag to be reached, then further reduce the acceptable lag amount until a switch from asynchronous to synchronous replication has occurred 850. Again, this transition may be transparent to the user as the replication may not need to be stopped and, if the target system needs to be slowed, the lag may not be recognizable by the user.

Referring to the embodiments of FIG. 9 in conjunction with FIG. 5, an amount to decrement the lag may be determined 915. The lag for the system may be set to be the current lag less the decrement X 920 or a lag if one had not been enforced. The lag may correspond to a measureable unit of delay such as a time, an amount of data, or a count of pending data. The decrement X may correspond to a predetermined factor as well as a factor set based on the load of the production site. When the IO 548 is received at the DPA 524 a receive acknowledgement may be sent to the production site. If the production site determines that the amount of IO sent but not confirmed to have been written to the replication site is within the lag 540, the production site may acknowledge IO to the protection agent. If the IO sent but not confirmed is not within the lag, the production site may be slowed 945. A determination of whether the IO may be within the lag may leverage the write acknowledgements from the DPA to determine how much of a lag exists on the production site.

The user may configure to move to sync replication if amount of data receiver by appliance is less then X MB/sec, and move to async if amount of data written is more the Y MB/sec (Y>X), measuring the incoming data rate is straight forward.

The user may also decide to move out of sync replication, if the added latency to each IO by replication is more then x ms (for instance more then 0.5 ms), and move out of asynchronous replication is latency is less then y ms (for instance 1 ms), (y>x) Measuring the IO latency in synchronous replication may be straight forward, the time elapsed from receiving the IO at the DPA until acknowledging the IO to the protection agent may be measured. A moving average for n seconds (say 10 seconds) of the latency of each IO is taken and this is our average latency.

For async replication the computation may be more complex, the latency from sending the IO to the remote DPA until acknowledgement is measured and not from the time the IOs arrives at the appliance, the average of this latencies are then taken. The user may also configure a scheduler to move to async on weekend for instance.

A determination may be made if replication is synchronous 950. If it is synchronous, then no further steps may be taken 955. If data replication is not synchronous, then a determination is made whether to receive more IO or to further decrease the lag 960. If a decision is made to further decrease the lag, then a further decrement may be determined and the process may be repeated 915. The amount of the decrement may be the same each time the lag is decreased, it may be calculated based on a percentage of the current lag, as well as a factor that will not noticeable slow the production site, or a factor that may not slow the production site. Applicants envision many ways that a decrement may be chosen.

If a decision is made not to decrease the lag, more IO may be processed 925. This decision may be made to delay the decrement of the lag in order to let the replication site process outstanding IO to limit how much the production site needs to be slowed. The gradual reduction of the lag may allow the production site to reduce the lag and transition to synchronous replication without noticeable slowing the production site.

The instant disclosure describes transitioning from asynchronous to synchronous replication and from synchronous to asynchronous replication. In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 11 shows Program Logic 1134 embodied on a computer-readable medium 1130 as shown, and wherein the Logic is encoded in computer-executable code configured for carrying out the reservation service process of this invention and thereby forming a Computer Program Product 1110.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in replication comprising:
dynamically switching between asynchronous replication and synchronous replication during continuous replication of intercepted IO being written in the production environment while the production environment is active; without stopping the continuous replication of IO from the production environment and the replication environment in a manner that is transparent to a user of the production environment; wherein switching from asynchronous replication to synchronous replication reduces IO transfer lag between the production environment and the replication environment in a manner transparent to a user until a synchronous replication policy has been reached; and wherein switching from synchronous replication policy to asynchronous replication policy enables IO transfer lag between the production environment and the replication environment; wherein switching from synchronous to asynchronous replication includes:
determining an IO transfer lag between the production environment and the replication environment; and acknowledging all IO transmitted between the production site and the replication site within the lag;
   determining a lag decrement for decreasing IO transfer lag between the production environment and the replication environment;
   reducing the IO transfer lag by the lag decrement; and
   updating the current IO transfer lag based on acknowledgements received from the replication site until the reduced lag has been reached; and
      continuing to reduce the lag by continuing to implement the reduction method, until a synchronous replication policy has been reached; wherein the lag is an amount of data.

2. The method of claim 1 wherein the lag is an amount of data.

3. The method of claim 1 wherein the lag is an amount of time.

4. The method of claim 1 wherein the system switches between asynchronous and synchronous replication based on a predetermined policy.

5. The method of claim 1 wherein the system switches from asynchronous to synchronous replication when a data rate between the production and replication site is low; and wherein the system switches from synchronous to asynchronous replication when latency between the production and replication site is high.

6. The method of claim 1 wherein switch between asynchronous and synchronous replication is based the load of the production environment.

7. The method of claim 1 wherein switch between asynchronous and synchronous replication is based the load of the production available bandwidth between the production environment and the replication environment.

8. A system comprising:
a production environment and
computer-executable logic operating in memory, wherein the computer-executable program logic is configured for execution of:
dynamically switching between asynchronous replication and synchronous replication during continuous replication of intercepted IO being written in the production environment while the production environment is active; without stopping the continuous replication of IO from the production environment and the replication environment in a manner that is transparent to a user of the production environment; wherein switching from asynchronous replication to synchronous replication reduces IO transfer lag between the production environment and the replication environment in a manner transparent to a user until a synchronous replication policy has been reached; and wherein switching from synchronous replication policy to asynchronous replication policy enables TO transfer lag between the production environment and the replication environment; wherein switching from synchronous to asynchronous replication includes:
determining an TO transfer lag between the production environment and the replication environment; and acknowledging all TO transmitted between the production site and the replication site within the lag;
   determining a lag decrement for decreasing TO transfer lag between the production environment and the replication environment;
   reducing the TO transfer lag by the lag decrement; and
   updating the current TO transfer lag based on acknowledgements received from the replication site until the reduced lag has been reached; and
      continuing to reduce the lag by continuing to implement the reduction method, until a synchronous replication policy has been reached; wherein the lag is an amount of data.

9. The system of claim 8 wherein the system switches from synchronous to asynchronous replication when a data rate between the production and replication site is high; and wherein the system switches from asynchronous to synchronous replication when a data rate between the production and replication site is low.

10. The system of claim 8 wherein switching from asynchronous replication to synchronous replication reduces IO transfer lag between the production environment and the replication environment in a manner transparent to a user until a synchronous replication policy has been reached; and wherein switching from synchronous replication policy to asynchronous replication policy enables TO transfer lag between the production environment and the replication environment.

11. The system of claim 8 wherein the system switches between asynchronous and synchronous replication based on a predetermined policy.

12. The system of claim 8 wherein the lag is an amount of time.

13. A program product for use in a system comprising a production environment and a replication environment, a program product comprising:
   a non-transitory computer-readable storage medium encoded with computer-executable program code enabling:

dynamically switching between asynchronous replication and synchronous replication during continuous replication of intercepted TO being written in the production environment while the production environment is active; without stopping the continuous replication of TO from the production environment and the replication environment in a manner that is transparent to a user of the production environment; wherein switching from asynchronous replication to synchronous replication reduces TO transfer lag between the production environment and the replication environment in a manner transparent to a user until a synchronous replication policy has been reached; and wherein switching from synchronous replication policy to asynchronous replication policy enables TO transfer lag between the production environment and the replication environment; wherein switching from synchronous to asynchronous replication includes:

determining an TO transfer lag between the production environment and the replication environment; and acknowledging all TO transmitted between the production site and the replication site within the lag;

determining a lag decrement for decreasing TO transfer lag between the production environment and the replication environment;

reducing the TO transfer lag by the lag decrement; and updating the current TO transfer lag based on acknowledgements received from the replication site until the reduced lag has been reached; and continuing to reduce the lag by continuing to implement the reduction method, until a synchronous replication policy has been reached; wherein the lag is an amount of data.

14. The computer product of claim 13 wherein switching from asynchronous replication to synchronous replication reduces TO transfer lag between the production environment and the replication environment in a manner transparent to a user until a synchronous replication policy has been reached; and wherein switching from synchronous replication policy to asynchronous replication policy enables TO transfer lag between the production environment and the replication environment.

15. The computer product of claim 13 wherein the lag is an amount of data.

16. The computer product of claim 13 wherein the lag is an amount of time.

17. The computer product of claim 13 wherein the system switches from asynchronous to synchronous replication when latency between the production and replication site is low; and wherein the system switches from synchronous to asynchronous replication when latency between the production and replication site is high.

18. The computer product of claim 13 wherein the system switches between asynchronous and synchronous replication based on a predetermined policy.

* * * * *